Oct. 8, 1957 — E. F. ALLBERT — 2,809,336
MOTOR CONTROL SYSTEM FOR TWIN DRIVE REVERSING HOT MILL
Filed Dec. 21, 1953 — 3 Sheets-Sheet 1

WITNESSES:
Edwin E. Bussler
Leon M. Garman

INVENTOR
Eugene F. Allbert
BY
Paul E. Friedemann
ATTORNEY

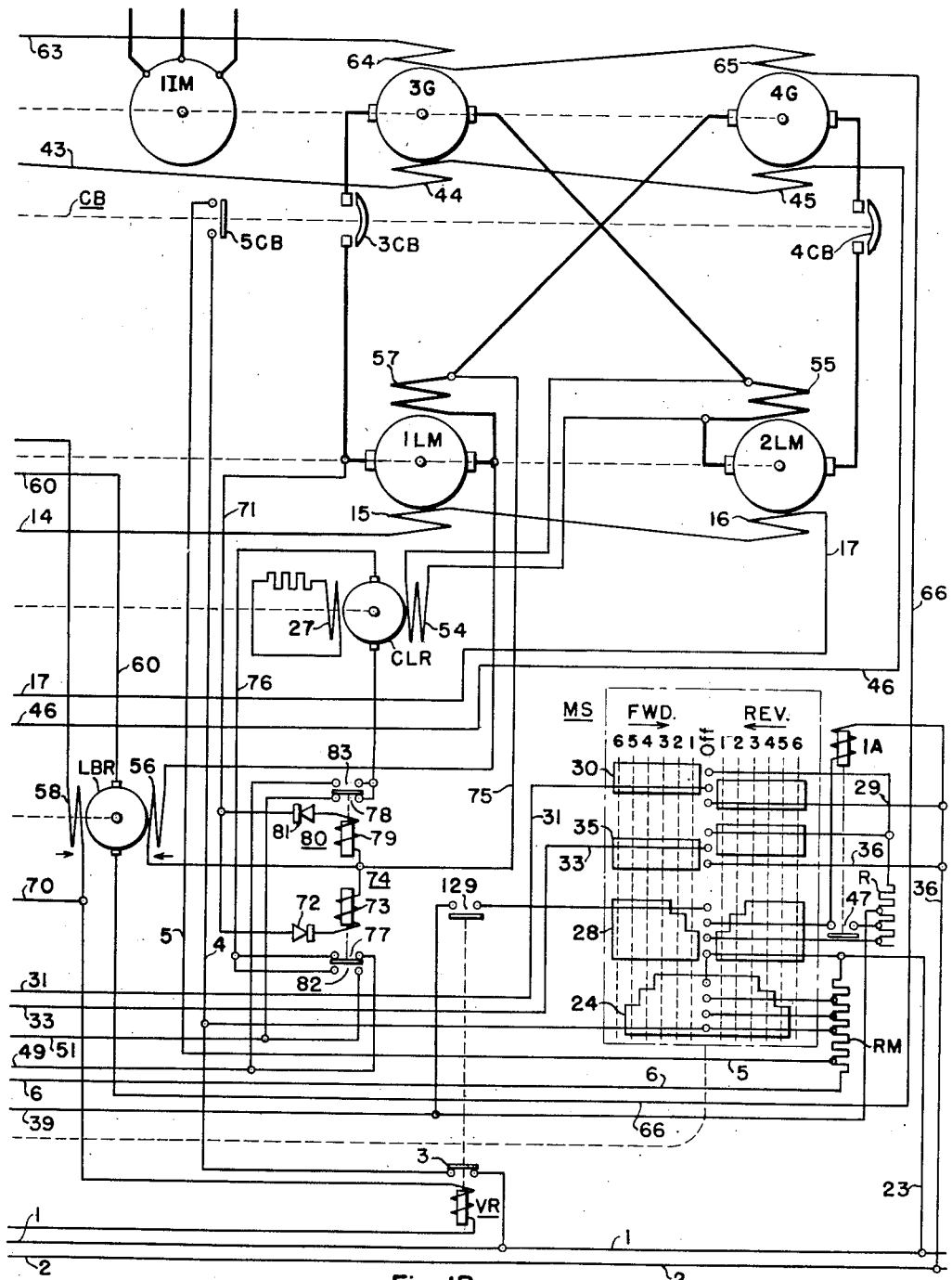

United States Patent Office 2,809,336
Patented Oct. 8, 1957

2,809,336

MOTOR CONTROL SYSTEM FOR TWIN DRIVE REVERSING HOT MILL

Eugene F. Allbert, Buffalo, N. Y., assignor to Westinghouse Electric Corporation, East Pittsburgh, Pa., a corporation of Pennsylvania Application December 21, 1953, Serial No. 399,351

7 Claims. (Cl. 318—149)

My invention relates to an electric control system and, more particularly, to a reversing control system for direct-current electric motors.

My system of control, while of general utility, has special utility for motors applicable to a twin drive hot mill including load balancing features.

One broad object of my invention is the provision of simpler, cheaper, and less load balancing equipment in a drive including a plurality of generators and a plurality of motors.

Another object of my invention is the provision of circuit arrangements of a plurality of interconnected motors and generators in which less power is transmitted per circuit, thus requiring less expensive switching apparatus.

A further object of my invention is the provision of a flexible system for running the load without any one armature, of the motors coupled to the load, operating at a lower load than a selected load, and without any one armature, of the generators supplying the motors, operating at a lower load than a selected load.

Figure 1A:
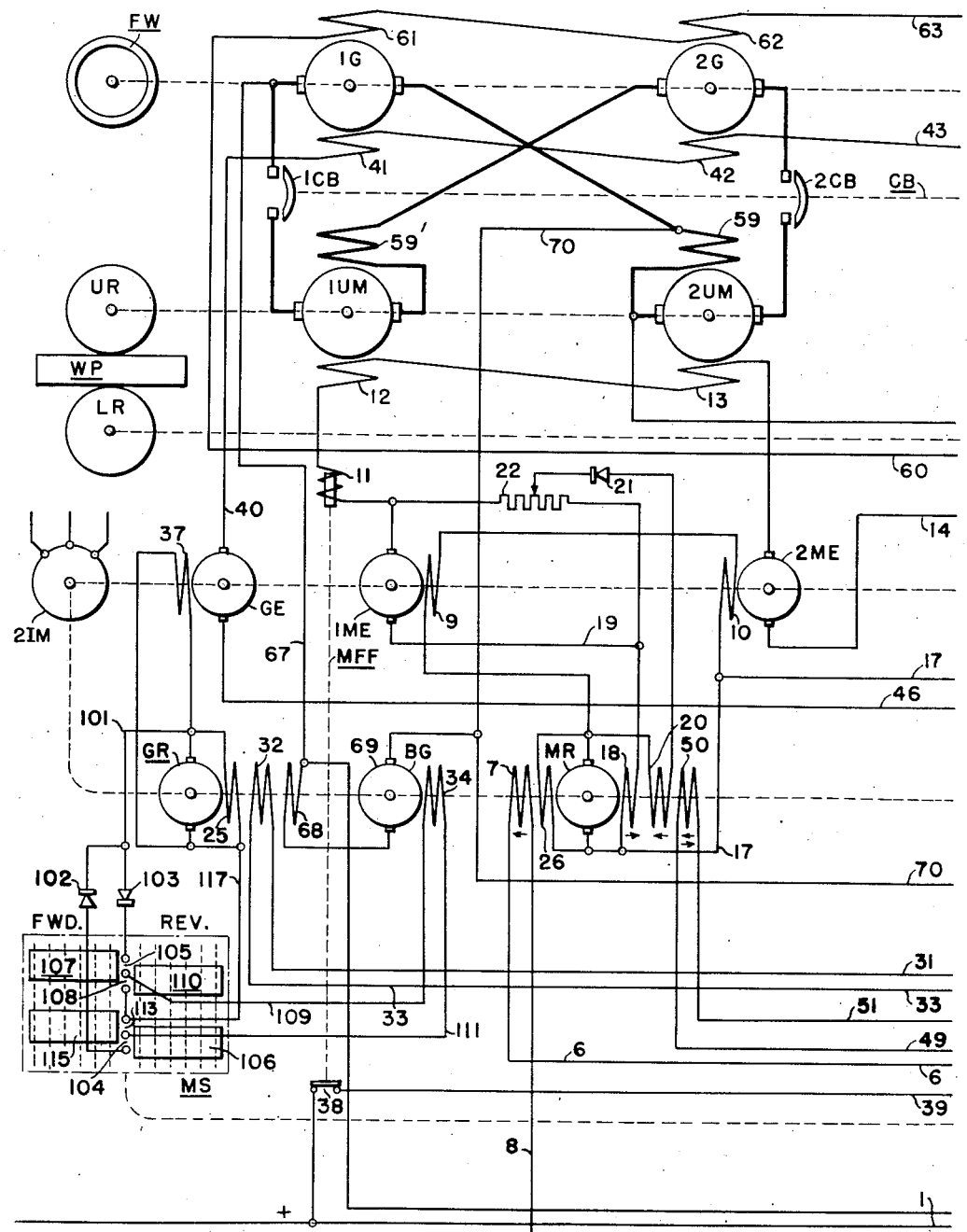
Figure 2:
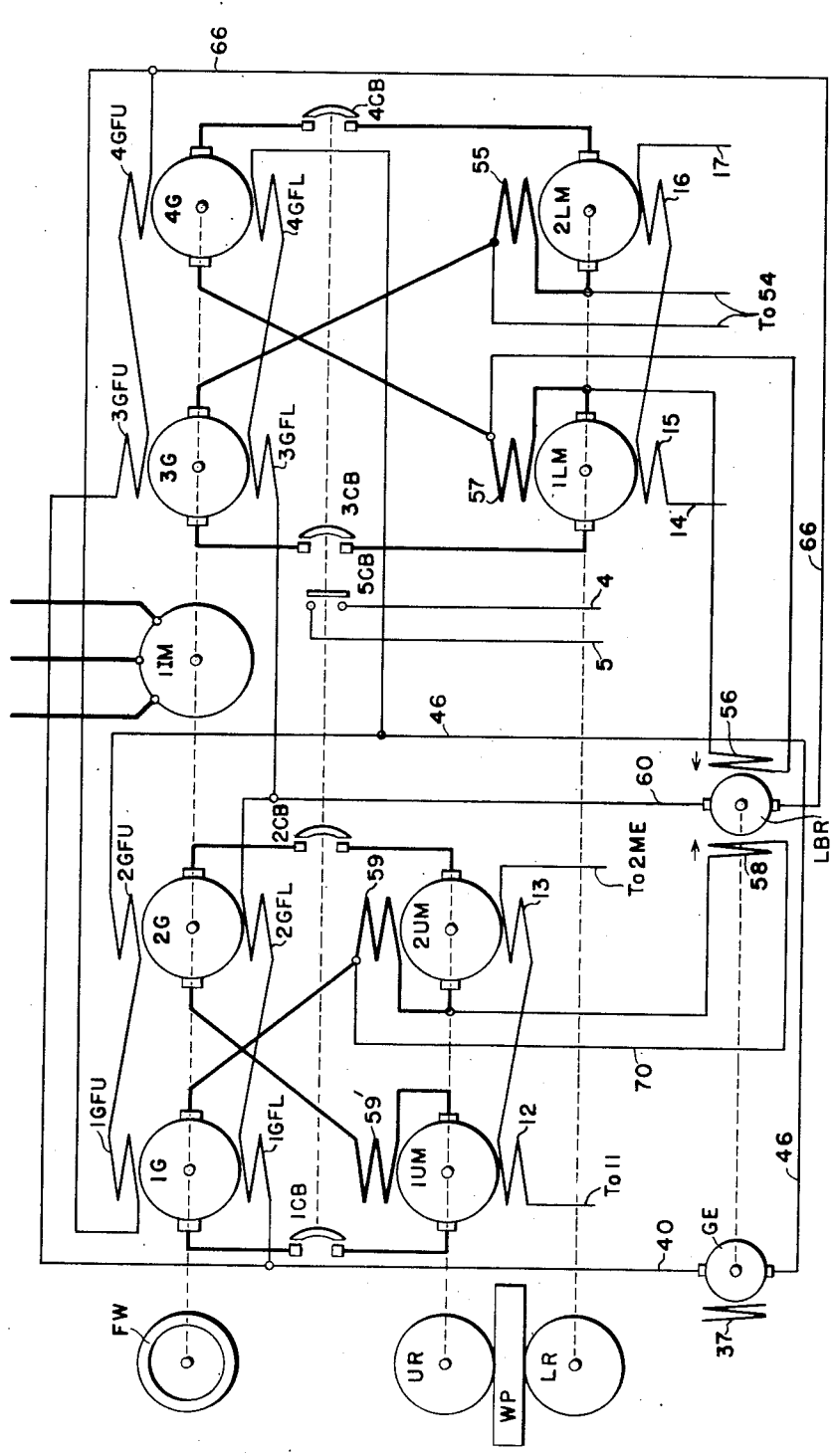

The objects above stated are merely representative. Other objects and advantages of my invention will become more apparent from a study of the following specification and the drawings, in which:

Figs. 1A and 1B together show diagrammatically the circuit arrangement of my control as applied to a twin drive reversing rolling mill operating on hot slabs of iron or other metal; and Fig. 2 diagrammatically shows a modified load balance control for an arrangement similar to that shown in Figs. 1A and 1B.

In the drawings, I show four generators 1G, 2G, 3G and 4G and four motors 1UM and 2UM, and 1LM and 2LM. The upper motors 1UM and 2UM are mechanically coupled, as shown, to the upper roll UR of the hot reversing slabbing mill and the lower motors 1LM and 2LM are mechanically coupled, as shown, to the lower roll LR of the slabbing mill. In the practice of my invention, suitable switching means, as the single four-pole circuit breaker CB shown, connects two of the generators to two of the motors, and connects the other two generators to the other two motors.

The connection of the generators 1G and 2G and the two upper motors 1UM and 2UM is such that the two armatures of these two mentioned generators and the two mentioned motors form a sandwiched loop. In other words, the loop includes, in the order named, the armature of generator 1G, the commutating field winding 59 of the upper motor 2UM, the armature of this motor 2UM, contacts 2CB of the circuit breaker CB, the armature of generator 2G, the commutating field winding 59' of the upper motor 1UM, the armature of this motor 1UM, the contacts 1CB of circuit breaker CB back to the armature of generator 1G.

From the foregoing paragraph it is apparent that with respect to generators 1G and 2G, motor 2UM is connected between these generators, and with respect to generators 2G and 1G, motor 1UM is connected between these generators. Similarly with respect to the motors, the generators are similarly connected between the motors. This kind of loop circuit I designate a sandwiched loop.

The connection of the generators 3G and 4G and the lower motors 1LM and 2LM is such that the two armatures of these two mentioned generators and these two mentioned motors form a sandwiched loop. In other words, the loop includes, in the order named, the armature of generator 3G, the commutating field winding 55 of the lower motor 2LM, the armature of this motor 2LM, the contacts 4CB of the circuit breaker CB, the armature of generator 4G, the commutating field winding 57 of the lower motor 1LM, the armature of this lower motor 1LM, the contacts 3CB of the circuit breaker CB back to the armature of generator 3G.

The generators 1G, 2G, 3G and 4G and the flywheel FW are all coupled to the relatively large wound-rotor induction motor 1IM, whereas the various exciters, GE, 1ME and 2ME, the biasing generator BG, and the regulating generators GR, MR, CLR and LBR are driven at constant speed by the induction motor 2IM. A main exciter, not shown, and other generators not part of this invention may also be coupled to this induction motor 2IM. A reversing master controller MS, operable either manually or automatically, is utilized to control the operation of the system.

A still better understanding of my system of control may be had from a study of a brief description of its operation.

Let the assumption be that the induction motors 1IM and 2IM are connected to be energized to thus accelerate to full speed, that the master switch MS is in the Off position shown, that the circuit breaker CB is operated to close its main contacts 1CB, 2CB, 3CB and 4CB, and the interlock contact 5CB, and that the voltage on the leads, or buses 1 and 2, is at a fixed full value.

As long as the voltage of the main generators 1G and 2G has not built up to full value, the coil of the voltage relay VR, which is connected directly across generator 1G as shown, is not energized sufficiently to cause the relay to pick up to open contacts 3 and to close contacts 129. The result is that a circuit is established from the positive lead 1 through contacts 3, conductor 4, interlock contacts 5CB, conductor 5, a small section of the resistor RM, conductor 6, the pattern field winding 7 of the regulating generator MR and conductor 8 to the negative lead 2.

This means that the regulating generator MR for controlling the excitation of the exciters 1ME and 2ME to thus control the excitation of the motors, is heavily excited. This is so because the voltage of the regulating generator MR builds up to its maximum value, for the particular voltage on leads 1 and 2, and thus establishes an exciting circuit for the field windings 9 and 10 of the motor exciters 1ME and 2ME. This exciting circuit may be traced from the upper armature terminal of the regulating generator MR through the field windings 9 and 10 of the exciters 1ME and 2ME, respectively, back to the lower armature terminal of generator MR. The exciters 1ME and 2ME are thus power amplifiers for MR.

The motor exciters are thus energized at a maximum value and in consequence the motor field windings 12, 13, 15 and 16 are thus heavily excited to provide the needed heavy starting torque when the armatures of the motors are energized. The exciting circuit for the motors 1UM, 2UM, 1LM and 2LM may be traced from the upper armature terminal of the exciter 1ME through the actuating coil 11 of the motor field forcing relay MFF, the series connected field windings 12 and 13 of the upper motors 1UM and 2UM, respectively, the armature winding of the exciter 2ME, conductor 14, the series connected field windings 15 and 16 of the lower motors 1LM and 2LM, respectively, conductor 17, differential field winding 18 of the regulating generator MR, and conductor 19 to the lower armature terminal of the exciter 1ME.

The modern trend in slabbing mill operation is toward the use of larger mills and more horsepower is being supplied to these mills. Also, quicker response is desired and is being supplied. The mills are also run at somewhat higher speeds, but not sufficient to offset the rise in size of dynamoelectric machines. The mill motors are thus relatively large machines so that the excitation currents used for these motors is of considerable value. The sandwiched circuit arrangement of the motor exciters and the motor field windings above recited is thus a rather important advance over the prior art because much smaller and thus less expensive exciters may be used than would otherwise be necessary.

As long as voltages of the exciters 1ME and 2ME are not up to full value, the modifying field winding 20 is energized to aid the pattern field winding 7 to thus further aid in building up the excitation of the exciters for the motor field windings. The modifying field winding 20 is used to change the rate of strengthening the excitation of the field windings of the motors. This controls the amount of regeneration when the motors start to slow down due to the rapid forcing of the field. The antihunt field winding 26 is a degenerating field and is thus used as the name implies. The circuit for this modifying field winding 20 may be traced from the upper terminal of regulating generator MR through the modifying field winding 20, rectifier 21, a portion of resistor 22, the armature of exciter 1ME, conductor 19, differential field winding 18 to the lower armature terminal of the regulating generator MR. Since the current for this last traced circuit traverses field winding 18 opposite to its normal sense, its control effect for the moment is substantially non-existent. As soon as the excitation of field windings 12, 13, 15 and 16 is up to the desired value, field winding 20 becomes deenergized and the differential field winding 18 assumes its proper control effect. As indicted by the arrow adjacent to field winding 18, it is apparent that this field winding 18 is connected differentially to the pattern field winding 7. The ampere turns for these two field windings 7 and 18 are so selected that they constitute the major controlling values of the output voltage of the regulating generator MR and thus the excitting current in the field windings 7 and 10 of the exciters 1ME and 2ME.

As soon as the voltage of the generator 1G is built up to full value, contacts 3 open, however, conductor 6 remains energized from lead 1 through conductor 23, controller segment 24 and now a slightly larger section of resistor RM.

There are other closed circuits in the system, as for example, the circuits for the antihunt field windings 25, 26 and 27 of the regulating generators GR, MR and CLR, respecively, but they are at the moment not of importance because the drive is still at rest.

By moving the master controller to the first forward position, a circuit is established from lead 1 through conductor 23, controller segment 28, all of the resistor sections of the rheostat R, conductor 29, controller segment 30, conductor 31, the pattern field winding 32 of the regulating generator GR to conductor 33, controller segment 35, and conductor 36 to lead 2. The regulating generator GR thus excites the field winding 37 of the generator exciter GE. The exciter GE is thus a power amplifier for the regulating generator GR.

The generator GR acts as a voltage regulator. The pattern field winding 32, as pointed out, is connected to the leads 1 and 2 and the strength of its excitation is varied by the operation of the master switch MS. This field winding 32 thus determines the voltage of the main generators. The field winding 68, discussed more in detail below, acts differentially to the field winding 32 and supplies feedback ampere turns to control the net ampere turns affecting the armature of generator GR.

The field winding 34 of the biasing generator is connected across the armature of the generator GR. To make sure that the polarity of the bias generator is always correct with reference to the polarity of generator GR, the field winding 34 is provided with forward and reverse contacts in series with the field winding 34, and blocking rectifiers 102 and 103 in series with these contacts. One of the circuits established by, say contacts, is to make the field winding 34 effective in the forward direction and the other of these circuits, established by, say contacts, is to make the field winding 34 effective in the reverse direction. The first circuit may be traced from the upper, or positive, terminal of generator GR through conductor 101, rectifier 103, contacts 105 bridged by the controller segment 107, conductor 109, field winding 34, conduct 111, contacts 113 bridged by the controller segment 115 and conductor 117 to the lower, or negative, terminal of generator GR. The second circuit may be traced from the upper generator terminal through conductor 101, rectifier 102, contacts 104 bridged by controller segment 106, conductor 111, field winding 34, conductor 109, contacts 108 bridged by the controller segment 110, and conductor 117 to the negative terminal of generator GR.

As long as the field current in the field windings 12, 13, 15 and 16 is not at its full high selected value, the full field relay MFF is not sufficiently energized to open the contacts 38. Contacts 38 thus establish a circuit from lead 1 through contacts 38, conductor 39, a few of the resistor sections of rheostat R to conductor 29. This means that the voltage of the regulating generator GR, and thus the exciter GE, and in turn the generators 1G, 2G, 3G and 4G builds up more rapidly to effect more rapid and more effective acceleration of the mill. When the field windings 12, 13, 15 and 16 are fully energized at the rated value, which will be the normal situation during slow initial starting or slow reversing, then contacts 38 will be open. During rapid reversing contacts 38 will normally be closed for a period just sufficient to aid in the rapid voltage build-up of the main generators to rated value. This is so because when the master controller is moved from the off position, say to the forward position, then the conductor 29 is energized at a higher value than is the case for the circuit for the field windings 32 and 34 discussed in the preceding paragraph. This means that the voltage of the main generators builds up very rapidly heading for a value that is higher than the normally desired value. As soon as the excitation of the motors is up to the normal or rated value, contacts 38 thus open and in consequence the excitation of the field windings 32 and 34 is determined by the setting of the rheostat R. The voltage of the main generators thus always heads for the desired value.

The full field relay MFF thus keeps the voltages of the generators at rated value until a certain amount of field strengthening has been accomplished. This again controls the amount of regenerative current during stopping or reversing from weak field speed.

The circuit for the main field windings 41, 42, 44 and 45 of the generators 1G, 2G, 3G and 4G, respectively, may be traced from the upper armature terminal of the exciter GE through conductor 40, field windings 41 and 42 of the generators 1G and 2G, respectively, conductor 43, field windings 44 and 45 of the generators 3G and 4G, respectively, and conductor 46 to the lower armature terminal of exciter GE.

Two somewhat smaller generator exciters than the single generator GE shown could be used if the sandwiched connection shown for the motor exciters 1ME and 2ME were used for the generator excitation, but since the generators are relatively high speed machines, their physical size, with reference to the motors, is small. This fact coupled with the fact that a relatively high voltage generator exciter may be used makes the need for a sandwiched connection of lesser importance for the excitation of the generators than for the excitation of the motors.

Movement of the master controller to the second and third positions in succession merely changes the speed setting by shunting more resistor sections of the resistor R. Movement of the controller to the second position energizes the time delay contactor 1A to effect an appropriate delay in the change in the speed setting by delaying the closing operation of contacts 47. In the third position, the main generators are excited a maximum. Conductor 29 is now energized from segment 28 through contacts 129 of relay VR and conductor 39 through the last section of resistor R. Any further increase of speed must be sought by motor field control.

In the fourth master controller position, one section of the resistor RM is inserted in the circuit of the pattern field winding 7, in the fifth position another resistor section is placed in the circuit of field winding 7 and in the sixth position still another resistor section is added in the circuit for field winding 7.

The load balancing regulator LBR has one of its field windings 56 connected directly across the commutating field winding 57 of motor 1LM and has its second field winding 58 connected directly across the commutating field winding 59 of the motor 2UM. The field windings 56 and 58 act differentially with respect to each other, and when the load currents in the two sandwich loop circuits are equal, the output of regulating generator LBR is zero.

If, for example, the load current in the right-hand loop circuit is greater than the load current in the other, or left-hand loop circuit, then the effect of the load balancing regulator is such that the voltage of generators 1G and 2G rises and the voltage of generators 3G and 4G decreases to thus balance the load. For the particular showing in the drawings, the upper armature terminal of generator LBR is shown as positive to thus establish an energizing circuit from this terminal through conductor 60, field winding 61 aiding field winding 41, field winding 62 aiding field winding 42, conductor 63, field winding 64 bucking field winding 44, field winding 65 bucking field winding 45, and conductor 66 to the lower armature terminal of load balancing regulating generator LBR.

When the lower armature terminal of the load balancing regulating generator is positive, representing a condition when the load current in the left-hand motor-generator sandwiched circuit is higher than the load current in the right-hand motor-generator sandwiched circuit, then an energizing circuit is established from the lower armature terminal of generator LBR through conductor 66, field winding 65 aiding field winding 45, field winding 64 aiding field winding 44, conductor 63, field winding 62 bucking field winding 42, field winding 61 bucking field winding 41, and conductor 60 to the upper, or negative, armature terminal of the load balancing generator LBR.

It is a rather important advance over the art to utilize the commutating field 57 and 59 of the motors 1LM and 2UM. The physical size of the main motors is rather large. This is even true with reference to the main generators. There are thus a considerable number of turns on these field windings. The voltage drop is thus relatively high. No special load responsive resistance shunts or other means are thus needed because the voltage drop across each of the windings 57 and 59 is ample to directly control the excitation of the load balance regulator generator LBR.

Assuming that the voltage across the armature terminals of motor 1LM is positive at the left and negative at the right, then a circuit is established from the left motor terminal through conductor 71, rectifier 72, actuating coil 73 of the relay 74, conductor 75, commutating field 57 of motor 1LM to the right armature terminal of motor 1LM. Relay 74 thus picks up establishing a circuit from the upper terminal of the current limit regulator generator CLR through conductor 76, contacts 77 of relay 74, conductor 49, current limit field winding 50 of the regulating generator MR, conductor 51, back contacts 78 of relay 80 to the lower terminal of generator CLR.

When the operation is such that the right terminal of motor 1LM is positive, then a circuit is established from the right terminal of motor 1LM through the commutating field winding 57, conductor 75, actuating coil 79 of relay 80, rectifier 81 to the negatively energized conductor 71. Operation of relay 80 establishes a circuit from the upper terminal of current limit regulating generator CLR through conductor 76, back contacts 82, conductor 51, current limit control field winding 50, conductor 49, contacts 83 of relay 80 to the lower terminal of generator CLR.

This current limit regulation generator has characteristics such that no voltage output is produced for all normal variations of excitation of its field winding 54, however, when the excitation current rises above a certain selected value, the voltage output rises fairly abruptly. For an understanding of this regulating generator in detail, reference may be had to Patent No. 2,411,371, issued to W. R. Harding on November 19, 1946, and to Patent No. 2,546,003, issued to A. W. Kimball et al. on March 20, 1951.

It will be noted that the field winding 54 of the current limiting regulating generator is connected directly across the commutating field winding 55 of the motor 2LM. This means that the exciting current in the field winding 54 is directly proportional to the load current in the right-hand sandwich loop circuit.

The current limit field winding 50, controlled by the regulating generator CLR, is used to add or subtract ampere turns from the algebraic sum of the ampere turns of the field windings 7 and 18. The field winding 27 on the current limit regulating generator CLR has an anticipatory effect during rapid changes of current in the field winding 54, when the current in the mill motor armatures is changing rapidly. The design of the field windings for this generator CLR is such that almost no voltage appears at its armature terminals until after about 900 ampere turns per pair of poles excitation are supplied by the field winding 54. Then the voltage starts to rise because the magnetic shunt this machine has across alternate poles becomes saturated. Reference may be had in this connection to the herein mentioned Patent No. 2,546,003. The effect of this circuit is to give the motors a stronger field as the load on the motors increases from a point of about 175% (when the motor field strength is equal to that of a weak field) to a full field strength at about 250%. These specific values of voltage and ampere turns mentioned apply only to a specific job on which this control is being used. The values will be different for motors and generators of different capacities as those skilled in the art will readily realize.

Since the load balancing regulating generator LBR balances the load of the two sandwich loop circuits, the field current in field winding 54 is a function of the mill load. Because of the special output voltage characteristics of the generator CLR, its effect on field winding 50 is to abruptly increase or decrease the excitation current in this field winding 50 when the mill load rises above a selected value.

The field winding 50 acts cumulatively with the pattern field winding 7. The final consequence is, when the mill load exceeds a selected value, that the output of regulating generator MR rises, the output of exciters 1ME and 2ME rises to increase the counter-electromotive force of the main motors to thus limit the load current.

The regulating generator GR also has a so-called differential field winding 68. This field winding 68 is connected in a loop circuit which may be traced from the left-hand armature terminal of generator 1G through conductor 67, field winding 68, the armature 69 of the bias generator BG and conductor 70 to the right-hand terminal of the armature of generator 1G. The voltage of the bias generator BG acts in opposition to the voltage of generator 1G. This means if the voltage of generator 1G is in excess of the desired value, for the particular speed setting, then field winding 68 bucks the field winding 32 to effect a decrease of the voltage of the main generators. When the voltage of the bias generator is in excess of the voltage of generator 1G, the field winding 68 aids field winding 32 to thus effect a rise in the voltage of the main generator. The field winding 68 thus supplied feedback ampere turns to control the net ampere turns affecting the armature of generator GR.

Since the master controller is designed for symmetrical reversing operations, a detailed discussion of the reverse operation is not necessary except to mention that when the load current is reversed as a result of a reverse energization of the pattern field windings 32 and 34, the current to the field winding 50 is also reversed to effect proper current limit control.

For some applications, it may be very desirable to somewhat increase the reluctance of the main generator to respond to load changes, and if that can be coupled with a more rapid control effect produced by the load balancing regulating generator, a very stable control may be effected. I obtain a greatly increased generator load balance gain and time delay. This I accomplish by the circuitry shown in Fig. 2. The field windings 56 and 58 of the load balance regulator generator LBR are again connected as before, namely, across the field windings 57 and 59, however, each of the main generators 1G, 2G, 3G and 4G is supplied with two field windings, as the field windings 1GFU and 1GFL, 2GFU and 2GFL, 3GFU and 3GFL, and 4GFU and 4GFL, respectively.

These field windings are connected in a bridge circuit, in which circuit, the leads 40 and 46 are the voltage supply junctions and leads 60 and 66 are the neutral junctions. The field windings 1GFL and 2GFL are in the first leg of the bridge and field windings 3GFU and 4GFU are in the second leg of the bridge and field windings 2GFU and 1GFU are in the third leg of the bridge, and field windings 3GFL and 4GFL are in the fourth leg of the bridge. The load balance regulator armature is connected across the junction (lead 60) between field windings 2GFL and 3GFL, and the junction (lead 66) between the field windings 1GFU and 4GFU. This makes the excitation supplied by exciter GE independent of the excitation supplied by the load balance regulator LBR. Further, when there is a load unbalance such that 1G and 2G assume more load, then the excitation of these generators 1G and 2G is not only rapidly decreased, but the excitation of generators 3G and 4G is rapidly increased. When the load unbalance is in an opposite sense, then a similar correction is in an opposite sense. Thus, rapid load balance correction is obtained, and the stability is resolved in two ways.

While I have disclosed but one embodiment of my invention, it is understood that the invention is capable of various adaptations and that changes and modifications may be made or substitutions resorted to which all come within the scope and spirit of my invention.

I claim as my invention:

1. In a system of control for use with four motors one pair of which motors, comprising a first motor and a second motor, having armatures coupled in driving relation with one element of a work device and the second pair of motors, comprising a third motor and a fourth motor, having armatures coupled in driving relation with a second element of said work device, a pair of generators, comprising a first and second generator, for the first pair of motors and a second pair of generators comprising a third generator and a fourth generator, for the second pair of motors, said generators having armature windings, the armature windings of the first pair of motors and the armature windings of the first pair of generators being connected in a sandwiched loop circuit, namely, the circuit including the first generator armature winding, the armature winding of the second motor, the armature winding of the second generator, the armature winding of the first motor, and a similar sandwiched loop circuit for the second pair of motors and second pair of generators.

2. In a system of control for use with four motors one pair of which motors, comprising a first motor and a second motor, having armatures coupled in driving relation with one element of a work device and the second pair of motors, comprising a third motor and a fourth motor, having armatures coupled in driving relation with a second element of said work device, a pair of generators, comprising a first and second generator, for the first pair of motors and a second pair of generators comprising a third generator and a fourth generator, for the second pair of motors, said generators having armature windings, the armature windings of the first pair of motors and the armature windings of the first pair of generators being connected in a sandwiched loop circuit, namely, the circuit including the first generator armature winding, the commutating field winding of the second motor, the armature winding of the second motor, the armature winding of the second generator, the commutating field winding of the first motor, the armature winding of the first motor, a similar sandwiched loop circuit for the second pair of motors and second pair of generators, a load balancing regulating exciter having one field winding energized as a function of the voltage drop across one of the motor commutating field windings in the first sandwiched loop circuit and having a second field winding energized as a function of the voltage drop across one of the motor commutating field windings in the second sandwiched loop circuit, and means responsive to the magnitude and polarity voltage output of the load balancing regulator for increasing the excitation of the generators in the sandwiched loop circuit carrying the lesser load current.

3. An electric system of control in combination, four electric motors, one pair of which motors, comprising a first motor and a second motor, having armatures, and windings thereon, coupled to one element of a work device, a second pair of motors, comprising a third motor and a fourth motor, having armatures, and windings thereon, coupled to a second element of a work device, a pair of generators, comprising a first generator and a second generator, for the first pair of motors, said first and second generators having armature windings connected in a sandwiched loop circuit with the armature windings of the first and second motors, a second pair of generators, comprising a third and fourth generator, for the second pair of motors, said third and fourth generators having armature windings connected in a second sandwiched loop circuit with the armature windings of the third and fourth motors, a load balancing regulating generator for producing a voltage of one polarity when the load current in the first sandwiched loop circuit is greater than the load current in the second sandwiched loop circuit and a voltage of an opposite polarity when the load current in first sandwiched loop circuit is less than the load current in the second sandwiched loop circuit, and means responsive to the magnitude of the load current in the first sandwiched loop circuit for increasing the voltage of the two generators in the second sandwiched loop circuit.

4. An electric system of control in combination, four electric motors, one pair of which motors, comprising a first motor and a second motor, having armatures, and windings thereon, coupled to one element of a work device, a second pair of motors, comprising a third motor and a fourth motor, having armatures, and windings thereon, coupled to a second element of a work device, a pair of generators, comprising a first generator and a second generator, for the first pair of motors, said first and second generators having armature windings connected in a sandwiched loop circuit with the armature windings of the first and second motors, a second pair of generators, comprising a third and fourth generator, for the second pair of motors, said third and fourth generators having armature windings connected in a second sandwiched loop circuit with the armature windings of the third and fourth motors, a load balancing regulating generator for producing a voltage of one polarity when the load current in the first sandwiched loop circuit is greater than the load current in the second sandwiched loop circuit and a voltage of an opposite polarity when the load current in first sandwiched loop circuit is less than the load current in the second sandwiched loop circuit, and means responsive to the magnitude of the load current in the first sandwiched loop circuit for increasing the voltage of the two generators in the second sandwiched loop circuit, and means responsive to the voltage drop above a selected value across the commutating field winding of one of the motors for effecting an increase in the counter-electromotive force of the motors.

5. An electric system of control, in combination, two generators and two motors connected in a sandwiched loop circuit, two other generators and two other motors connected in a second sandwiched loop circuit, means for balancing the loads in the loop circuits, means for increasing the counter-electromotive force of the motors upon a rise in load current above a selected value in one loop circuit, means for selecting the voltage level at which the generators are to operate, and means for regulating for a constant voltage for the voltage level selected.

6. An electric system of control, in combination, two generators and two motors connected in a sandwiched loop circuit, two other generators and two other motors connected in a second sandwiched loop circuit means for balancing the loads in the loop circuits, means for increasing the counter-electromotive force of the motors upon a rise in load current above a selected value in one loop circuit, means for selecting the voltage level at which the generators are to operate, means for regulating for a constant voltage for the voltage level selected, said means for increasing the counter-electromotive force of the motors including field windings for each motor and a pair of exciters, and circuit means for connecting the exciters in a sandwiched loop circuit with said motor field windings.

7. An electric system of control for one pair of motors and generators connected in one sandwiched loop circuit, and a second pair of motors and generators connected in a second sandwiched loop circuit, including means for balancing the load currents in the two loop circuits and means for increasing the counter-electromotive force of the motors upon a rise in load current in one of the loop circuits above a selected value.

References Cited in the file of this patent

UNITED STATES PATENTS

| | | |
|---|---|---|
| 2,597,095 | Harder et al. | May 20, 1952 |
| 2,611,114 | Fisher | Sept. 16, 1952 |